Aug. 15, 1944.  C. C. CALKINS  2,355,950
ROTARY ROD WEEDER
Filed Nov. 2, 1940   2 Sheets-Sheet 1

Inventor:
Claude C. Calkins,
By Soans, Pond & Anderson,
Attorneys

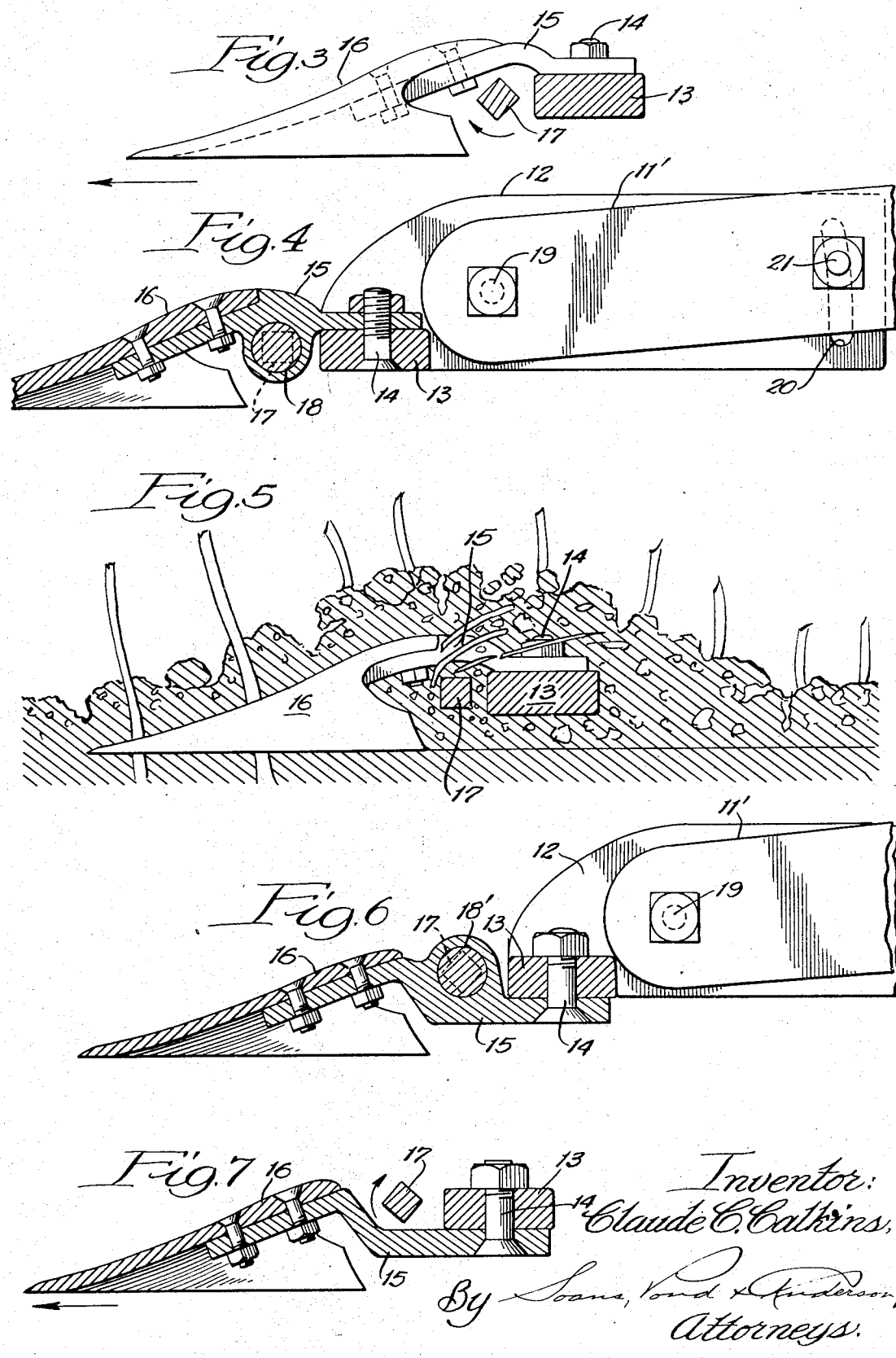

Patented Aug. 15, 1944

2,355,950

UNITED STATES PATENT OFFICE 2,355,950

ROTARY ROD WEEDER

Claude C. Calkins, Spokane, Wash.

Application November 2, 1940, Serial No. 364,007

8 Claims. (Cl. 97—42)

This invention relates to weeders of the general type disclosed in my former patents, No. 1,818,532, August 11, 1931, and No. 1,910,881, May 23, 1933, wherein the weeding tool consists of a rod of square cross-section journaled in the lower ends of a gang of parallel longitudinal goose-neck beams and rotating in a backward direction relative to the direction of travel of the machine beneath the surface of the ground to uproot and throw backward weeds, grain stubble and the like.

It has heretofore been known, as shown for example by my prior Patents Nos. 1,781,157, November 11, 1930; 1,804,672, May 12, 1931; and 1,840,617, January 12, 1932, to mount shovels or pointed shoes on the lower ends of the longitudinal beams and mount the rotary weeder rod in bearings in the shanks of said shovels or shoes. But since there are usually not more than four such beams on each machine, the capacity of the shovels or shoes to break up the surface of the ground and prepare the latter for the effective operation of the square weeder rod has been very limited.

The main object of this invention has been to provide a means for greatly increasing the number of the shovels or shoes that may be used on a rotary rod weeder of this type, so as to break up the entire surface of the ground in advance of the weeder rod for the full width of the machine, and the primary element of this means consists of a bar that is attached to the lower ends of the longitudinal beams of the machine and itself constitutes a support for the shanks of a gang of pointed shovels or shoes that can be disposed in close sidewise proximity to each other. Preferably, and as shown in the drawings and hereinafter described, this bar is so mounted on the lower ends of the longitudinal beams that it can be tilted to vary the angular pitch of the shovels and cause the latter to penetrate the ground to a greater or less depth, as the condition of the ground may make desirable.

Other objects and attendant advantages of the invention will be apparent to persons skilled in the art from the following description of a practical and preferred embodiment thereof shown in the accompanying drawings, in which—

Fig. 3 is an enlarged cross-section, taken on the line 3—3 of Fig. 2.

Fig. 4 is an enlarged cross-section, taken on the line 4—4 of Fig. 2.

Fig. 5 is a cross-section, roughly illustrating the operation of the shovels on the top film of earth and the weeds and grain stubble therein.

Fig. 6 is a view similar to Fig. 4, illustrating a modification in the shovel shank attachment to the transverse bar and the location of the weeder rod bearing.

Fig. 7 is a view similar to Fig. 3, illustrating a modification wherein all the shovel shanks are attached to the bottom of the transverse bar and the weeder rod is above the shank.

Figure 1:
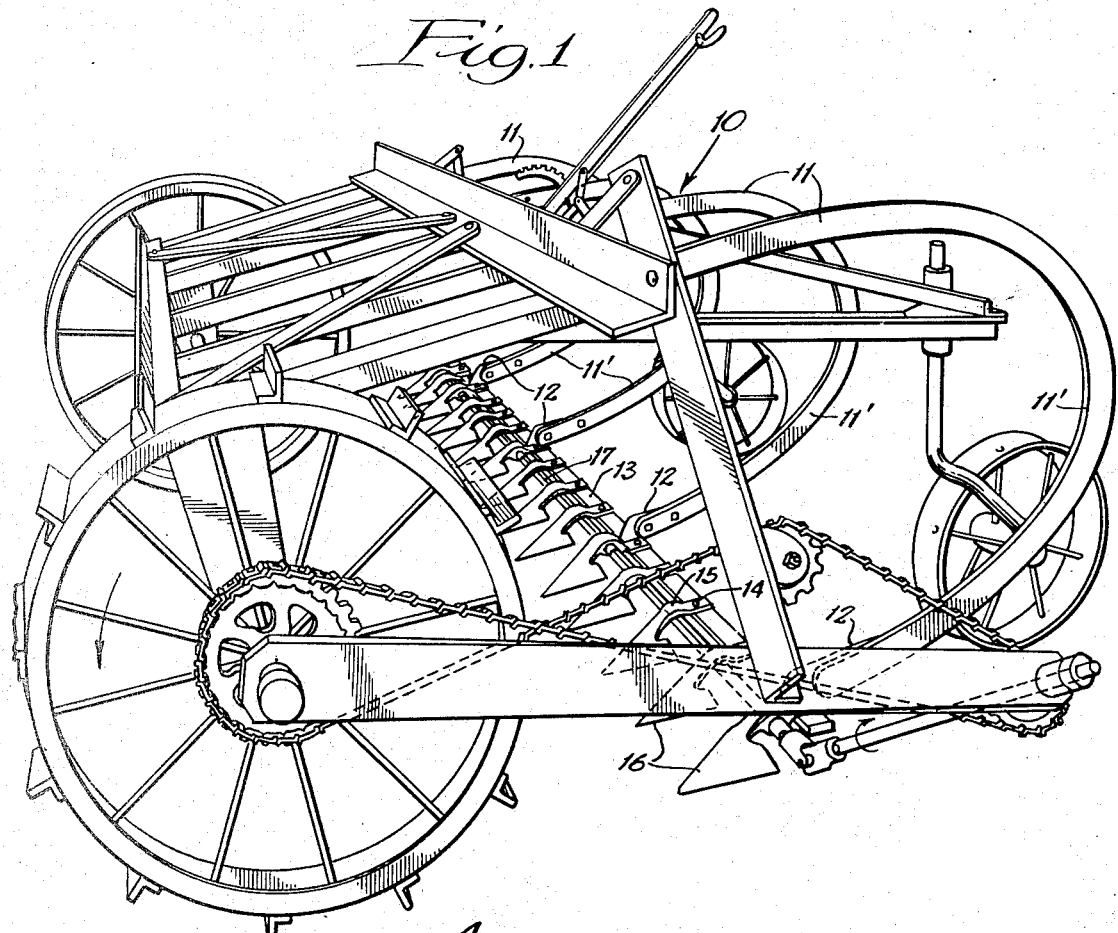
Fig. 1 is a perspective view of the rod weeder equipped with my present improvement.

Referring to the drawings, I have shown in Fig. 1 a machine which, except for the improvements hereinafter described, is substantially the machine of my former Patent No. 1,818,532, modified by the substitution therein of the drive for the weeder rod disclosed in my later Patent No. 1,910,881. The machine includes a frame structure designated as an entirety by 10, rigidly mounted in which frame are a gang of rearwardly extending, parallel, longitudinal beams 11 terminating at their rear ends in depending curved portions 11'.

Referring to Figs. 4 and 6, mounted on the lower ends of the depending portions 11' of the beams are bracket plates 12, and extending crosswise of, and suitably attached to the forward portions of these bracket plates is a straight flat horizontal bar 13. Attached to this bar 13 as by bolts 14 are the rear ends of the shanks 15 of a corresponding plurality of shovel blades 16.

Certain of these shanks 15 are formed between the bar 13 and the shovel blade 16 with bearings in which is journaled the square rotary weeder rod 17. These shovel shanks 15 may be attached to the top side of the bar 13, with rod bearing 18 formed in the lower portion of the shank, as shown in Fig. 4; or, the shank may be attached to the bottom side of the bar 13, with the rod bearing 18' formed in the upper portion of the shank, as shown in Fig. 6; these two arrangements being optional.

In the case of the intermediate shovel shanks 15 that are not equipped with bearings for the weeder rod, these may be so formed as to overlie the weeder rod, as shown in Fig. 3, or to underlie the weeder rod, as shown in Fig. 7.

The bracket plates 12 are preferably attached to the lower ends of the beams 11 by means which permits said bracket plates to be tilted in a vertical plane, so as to thereby vary the angular pitch of the bar 13 and the shovels 16 and cause the latter to penetrate the ground more or less deeply. The means shown for this purpose consists of a pivot bolt 19 connecting the parts 12 and 11', an arcuate slot 20 in one of the members 12 and 11' that is concentric with the pivot 19, and a clamp bolt 21. However, the bracket plates 12 may be fixedly secured to the beams in cases where variations in the angular pitch of the shovels are not desired.

Figure 2:
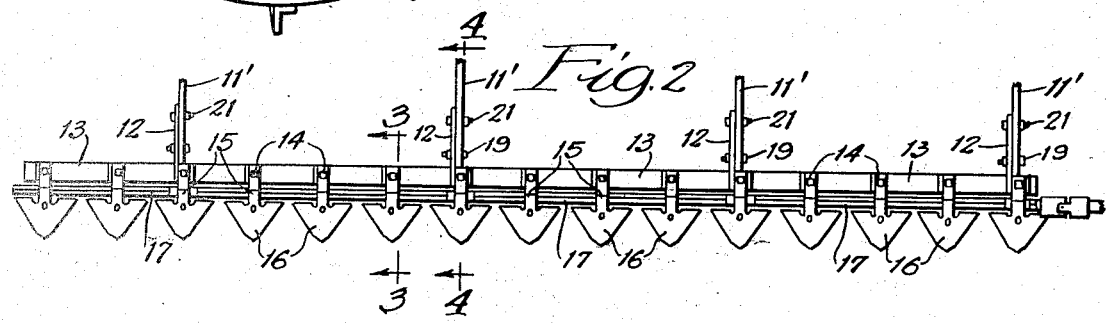
Fig. 2 is a top plan view of the ground-engaging elements of the machine shown in Fig. 1.

As shown in Figs. 1 and 2, a large number of shovels 16, set closely adjacent to each other, are employed. These shovels very effectively break up and loosen the soil in advance of the weeder rod 17, so that the latter, which turns clockwise viewing Figs. 3 to 7, very effectively uproots the weeds, throwing the latter rearwardly over the bar 13. Fig. 5 roughly discloses the operation of the shovels in raising the top film of the soil, and killing the weeds. Among the advantages of this invention may be mentioned the fact that weeds grow up in the spring grain and, after the crop is cut off, these weed plants mature and scatter the seed, and this tool makes it possible for the farmer to cover his entire stubble field at a very reasonable cost and kill these weeds so the seed will not mature.

Again, the device leaves the bulk of the stubble standing upright, as indicated in Fig. 5 which prevents the snow from blowing off, and further, it loosens the surface soil so that the fall and winter moisture readily penetrates the soil.

A third and equally important advantage is that it can be used in the spring instead of a plow. It will penetrate into the soil and loosen it to the desired depth, and leave the trash on top. If desired, a rod weeder of the same type, but without the shovels, can be subsequently used and the soil tilled closer to the surface to kill any of the small weeds which were not killed in the first operation where the soil was tilled to a plow depth.

Soil which lies fallow sometimes becomes packed by rain, and again in certain sections with heavier soil types the soil packs and runs together more or less after plowing so that it is impracticable to use a plain rod weeder; and this invention makes it possible to use this rod weeder and gain the advantages from rod weeding in preference to other types of tillage such as disking, etc. which dries out the soil. The rod weeder has a tendency to firm the soil underneath, while leaving a loose mulch on top, and lifts those clods and trash to the top to help make a better mulch, and all this is done without disturbing the lower moisture.

I claim:

1. In a weeder of the class described having a gang of parallel longitudinal beams having depending rear portions, the combination of a flat bar extending crosswise of the lower ends of said beams, a group of shovels having shanks attached to and extending forwardly of said bar, certain of said shanks formed with bearings, and a rotary weeding rod mounted in said bearings parallel with said bar, and means for attaching said flat bar to the lower ends of said beams including means for adjusting the angular pitch of the bar and shovels to permit the latter to penetrate the ground more or less deeply.

2. In a weeder of the class described having a gang of parallel longitudinal beams having depending rear portions, the combination of a flat bar extending crosswise of the lower end of said beams, bracket plates for attaching said bar to said beams, said bracket plates being vertically pivoted on horizontal pivots on the side of the beams to tilt on the latter in vertical planes, means for locking the bracket plates to the beams in any tilted position of the bracket plates, a group of closely adjacent shovels having shanks attached to and extending forwardly of said bar, certain of said shanks lying adjacent to said bracket plates formed with bearings, and a rotary weeding rod mounted in said bearings parallel with said bar.

3. A rotary rod weeder of the class described comprising a frame having a plurality of depending portions, a normally horizontal bar extending transversely of said depending frame portions, means for attaching said bar to said depending frame portions for pivotal adjustment of said bar about an axis extending in the direction of the length of the bar, a rotatable weeder rod and a series of plow shovels in advance of said rod, said rod and shovels being connected in normally fixed relation to said bar so as to be adjustable therewith as a unit about said axis of adjustment.

4. A rotary rod weeder comprising a frame having depending portions, a horizontal bar mounted on the lower ends of said depending frame portions, a weeding rod mounted for rotation in front of said horizontal bar, and a series of plow shovels carried by said horizontal bar and extending forwardly of said weeding rod to cut and loosen the earth in advance of said weeding rod and said horizontal bar, said plow shovels having portions extending over said weeding rod so as to tend to guide some of the loosened earth and weeds contained therein over the weeding rod.

5. A rotary rod weeder comprising a frame having depending portions, a horizontal bar mounted on the lower ends of said depending frame portions, a weeding rod mounted for rotation in front of said horizontal bar, and a series of plow shovels carried by said horizontal bar and extending forwardly of said weeding rod to cut and loosen the earth in advance of said weeding rod and said horizontal bar, said plow shovels having portions extending over said weeding rod and said bar so as to tend to guide some of the loosened earth and weeds contained therein over the weeding rod and bar.

6. A rotary rod weeder comprising a frame having depending portions, a horizontal bar mounted on the lower ends of said depending frame portions, a weeding rod mounted for rotation in front of said horizontal bar, and a series of plow shovels forwardly of said weeding rod having substantially symmetrical rearwardly and sidewise extending wing portions and a narrow central, rearwardly extending shank portion extending upwardly and over said rod and bar and being secured to the bar, said plow shovels serving to cut and loosen the earth in advance of said weeding rod and horizontal bar, and said central shank portions serving to guide some of the loosened earth and weeds contained therein over said weeding rod and bar.

7. A rotary rod weeder having a series of plow shovels in advance of the rod for cutting and loosening the earth to facilitate passage of the rod therethrough, the plow shovels having rearwardly and sidewise extending wing portions, the latter terminating in front of said rod with the upper surfaces of their rear end portions disposed in planes which extend substantially below the plane of the lowermost portion of the rod but not substantially above the same, thereby to permit free passage of loosened earth into engagement with and under said rod.

8. A weeder of the class described comprising a rotary rod, a series of plow shovels in advance of said rod for cutting and loosening the earth to facilitate passage of the rod therethrough, a normally stationary bar in back of said plow shovels and rod, said plow shovels having substantially symmetrical rearwardly and sidewise extending wing portions and a central, rearwardly extending shank portion, said shank portion extending upwardly and over said rod and bar, and being secured to said bar, said wing portions terminating in front of said rod with the upper surfaces of their rear end portions disposed in planes which extend substantially below the plane of the lowermost portion of the rod but not substantially above the same, thereby to permit free passage of loosened earth into engagement with and under said rod.

CLAUDE C. CALKINS.